July 11, 1939.　　　　　S. MANDL　　　　　2,165,285
SPRING PERCH AND BRAKE BRACKET REMOVER
Filed Dec. 27, 1937
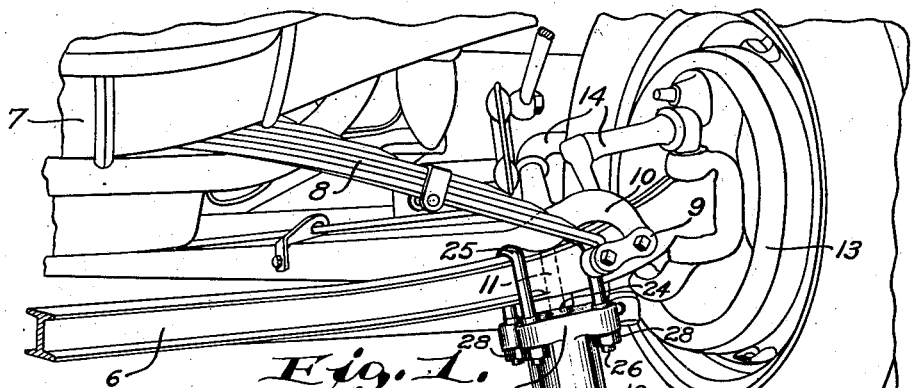
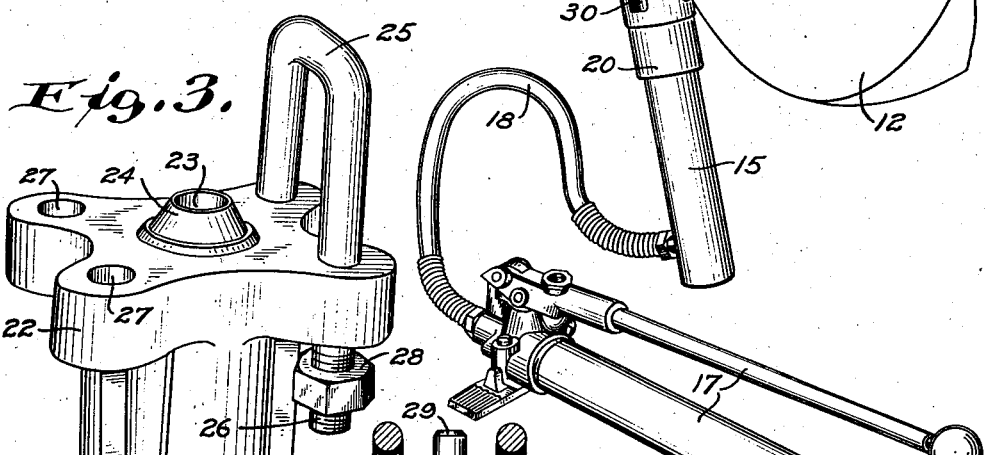
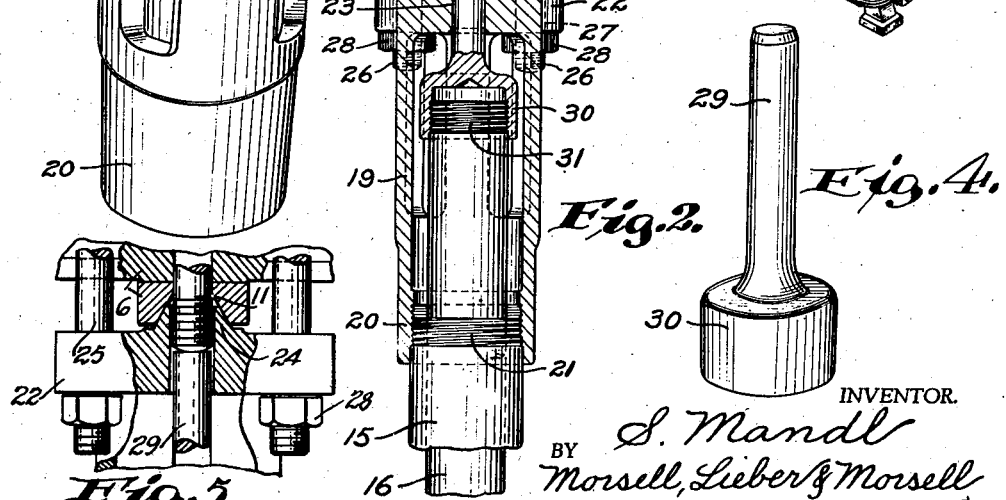
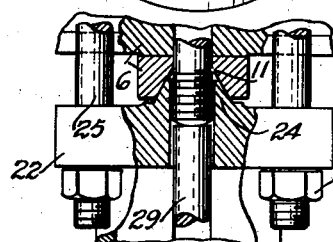
INVENTOR.
S. Mandl
BY Morsell, Lieber & Morsell
ATTORNEYS.

Patented July 11, 1939

2,165,285

UNITED STATES PATENT OFFICE 2,165,285

SPRING PERCH AND BRAKE BRACKET REMOVER

Siegmund Mandl, Milwaukee County, Wis., assignor to Blackhawk Mfg. Co., Milwaukee, Wis., a corporation of Wisconsin Application December 27, 1937, Serial No. 181,980

2 Claims. (Cl. 29—85)

My invention relates generally to improvements in devices for facilitating removal of relatively inaccessible parts of automobiles or the like, and relates more specifically to improvements in the construction and operation of appliances for removing the perch bolts which normally secure the brake brackets to the axles of vehicles.

A general object of the invention is to provide an improved jack attachment which may be conveniently and effectively employed to remove the perch bolts for the brake brackets from the axle beams of automobiles.

It is a rather tedius and slow job to remove the so-called perch bolts which normally attach the brake and spring brackets to the opposite ends of the front axles of modern automobiles, because of the irregular shapes of these brackets and of the numerous obstructions which surround the brackets and their attaching bolts. Such removal of the perch bolts is often desirable for repair purposes, and since many garages have definite schedules of charges for renewal of parts, it is desirable that replacements be made with minimum effort and loss of time. These perch bolts have heretofore been removed in various ways, as by removing the axle and driving the bolts out with presses, or with the aid of sledge hammers and heat applied to the axle, or with special tools having hooks adapted to engage the axle and cooperating with a jack screw. Another method used involved the use of a jack and cross beams, and adjustable chains embracing the axle on opposite sides of the bolts, but these chains would slip and would thus destroy the alinement of the jack plunger with the bolt. Unless the pressure thus applied is in perfect axial alinement with the perch bolt, it is not only difficult to remove these bolts, but damage to the axles may result, and with the prior cross-beam and chain assemblages it was impossible to accurately aline the drift pins and perch bolts so as to effect rapid and most effective removal of the latter.

My present invention therefore contemplates provision of a greatly improved attachment or assemblage, for expediting removal of perch pins or the like from axle beams, and for insuring such removal without damaging adjacent parts.

Another specific object of my invention is to provide a new and useful implement for effecting removal of snugly fitted pins from the medial portions of beams, with minimum effort, the implement being especially adapted for use with a hydraulic jack.

A further specific object of the invention is the provision of an improved jack attachment which is simple, compact and durable in construction, which may be readily applied to or removed from a jack assemblage, and which requires no expert knowledge for efficient use thereof.

The foregoing as well as other specific objects and advantages will be apparent from the following detailed description.

A clear conception of the several features constituting my present improvement, and of the manner of constructing and of utilizing perch pin removers built in accordance with my invention, may be had by referring to the illustrative drawing accompanying and forming a part of this specification wherein like reference characters designate the same or similar parts in the various views.

Fig. 1 is a perspective illustration of a fragment of the front portion of a standard automobile, showing one of my improved appliances in position preparatory to the removal of one of the perch bolts;

Fig. 2 is an enlarged central longitudinal section through the improved attachment, showing the same applied to fragments of a hydraulic jack assemblage;

Fig. 3 is a further enlarged perspective view of the external or reaction element of the device;

Fig. 4 is a similarly enlarged perspective view of the internal or pusher element of the appliance; and Fig. 5 is a fragmentary part sectional view showing the mode of cooperation of the improved tool with an axle.

While my invention has been specifically illustrated herein, as being embodied in an attachment especially adapted for cooperation with a hydraulic jack and for use in ejecting perch pins from front axle beams, it is not my intention to thereby unnecessarily restrict the scope or range of use of the improvement.

Referring particularly to Fig. 1 of the accompanying drawing, the standard automobile assemblage shown therein, comprises generally a main or front axle 6 upon which the body and chassis structure 7 is mounted by means of springs 8 and shackles 9 pivotally suspended from brackets 10 having integral perch bolts 11 snugly fitting substantially vertical holes formed in the opposite end portions of the axle 6; and wheels 12 swingably journaled at the opposite extreme ends of the axle 6 and having brakes 13 operable by mechanism 14 associated with the brackets 10, in a well known manner. Because of the fact that the springs 8 and shackles 9, as well as numerous other parts such as guards and bumpers, are located in close proximity to and around the brackets 10 and pins or bolts 11, and that these perch bolts are frequently corroded and marred so as to firmly attach them to the axles 6, it becomes quite a difficult matter to remove the brackets 10 and their anchoring bolts 11. This difficulty is often increased by the distortion of parts caused by accidents, especially when the axle 6 is bent and other structure is jammed against the brackets 10 and adjacent parts.

It is usual practice in removing perch bolts 11, to remove the axles and to thereafter eject the bolts with presses, but with my invention it is possible to utilize a jack and the mechanism may be of any suitable type, either mechanically or hydraulically actuated. As shown in Fig. 1, the hydraulic jack mechanism employed is of the portable type, and consists of an outer member or cylinder 15; an inner member or plunger 16 (Fig. 2) movable longitudinally of the cylinder 15; a pressure producing pump 17 for creating hydraulic pressure between the cylinder 15 and plunger 16; and a flexible connection 18 for conducting liquid to and from the cylinder 15 and pump 17, and vice versa. The hydraulic jack assemblage is of well known construction and may be used for many other purposes, and a mechanical jack may obviously be substituted.

The improved bracket and perch bolt remover is shown generally in Fig. 1, and more in detail in Figs. 2, 3 and 4, and comprises a hollow outer reaction element 19 having an integral tubular lower end 20 internally screw threaded for attachment to the threaded end 21 of the cylinder 15, and having its opposite end provided with a solid head 22 formed with a central bore 23 and with a tapered annular ridge 24 adjoining the bore; a pair of laterally spaced U-bolts 25 having depending threaded end portions 26 insertible through holes 27 formed in the head 22 and adapted for the reception of clamping nuts 28; and a pusher pin or internal element 29 slidably engageable with the head bore 23 and having an integral internally threaded socket 30 at its lower end formed for convenient attachment to the threaded upper end 31 of the jack plunger 16. The elements 19, 29 should be of durable construction, and while the socket 30 is normally movable within the hollow element 19, this socket should be freely endwise removable through the threaded end 20 of the reaction element 19.

During normal use and operation of the improved bracket remover, the elements 19, 29 should first be properly applied to the threaded ends 20, 21, respectively, of the relatively movable outer and inner jack members 15, 16, and the U-bolts 25 should be applied to the axle 6 as shown in Fig. 1, and the nuts 28 should thereafter be applied to the threaded ends 26 so as to force the annular ridge 24 of the element 19 into firm engagement with the similarly formed recess in the bottom of the axle 6 adjoining the pin or bolt 11. When the nuts 28 are manipulated so as to produce the final clamping effect, the ridge 24 will be caused to snugly engage the recess in the axle and will thus bring the bore 23 into perfect axial alinement with the bolt 11 by virtue of the external taper of the ridge 24 which snugly engages the similarly tapered axle recess surrounding the bolt 11. During this application of the implement to the axle 6, the pusher element 29 will of course be retracted sufficiently so as to permit proper application of the ridge 24 to the axle 6. The pump 17 may thereafter be manipulated so as to cause the pin 29 to slide upwardly within the bore 23 and to engage the lower end of the perch bolt 11. Subsequent operation of the pump 17 will cause the element 29 to push the perch bolt 11 out of its confining hole in the axle 6 and will elevate the bracket 10 until the latter is finally released and freely movable. The pusher element 29 may then be retracted, and the perch bolt remover may be removed from the axle by removing the clamping nuts 28.

From the foregoing detailed description it will be obvious that the present invention provides a simple, compact and durable tool for effecting rapid and convenient removal of the perch bolts 11, without danger of marring the adjoining structure. The U-bolts 25 are preferably formed so that when they are brought into clamping position, they will also tend to centralize the ridge 24 within its receiving recess, and these U-bolts will obviously firmly hold the element 19 so that the bore 23 thereof will be maintained in perfect alinement with the adjacent perch bolt 11. The U-bolts 25, besides serving as effective means for clamping the element 29 to the axle, also are conveniently applicable and removable and occupy minimum space. The U-bolts 25 futhermore serve to uniformly distribute the clamping effect over the entire head 22, and this head 22 serves to guide the pin element 29 when the actual bolt removing pressure is being applied to the hydraulic jack. The present invention has proven highly successful in actual commercial use, and will permit rapid and effective removal of the perch bolts with minimum loss of time.

It should be understood that it is not desired to limit the invention to the exact details of construction or to the precise mode of operation, herein shown and described, for various modifications within the scope of the claims may occur to persons skilled in the art.

I claim:

1. In combination, a reaction element having one end formed for attachment to the normally stationary portion of a jack and having a bored head at its opposite end provided with a tapered centering ridge adjoining the bore and snugly engageable with a similarly tapered recess in the work, a pushing element having one end formed for attachment to the movable member of the jack and having its opposite end portion slidable within said bore, and laterally spaced rigid clamping elements coacting with said head on opposite sides of said bore to clamp said ridge within said recess.

2. In combination, a reaction element having one end formed for attachment to the normally stationary portion of a jack and having a bored head at its opposite end provided with a tapered centering ridge adjoining the bore and snugly engageable with a similarly tapered recess in the work, a pushing element having one end formed for attachment to the movable member of the jack and having its opposite end portion slidable within said bore, a pair of laterally spaced U-bolts coacting with said head on opposite sides of said bore, and adjustable nuts coacting with said U-bolts and with said head to clamp said ridge within said recess.

SIEGMUND MANDL.